United States Patent
De Wilde et al.

(10) Patent No.: US 11,499,929 B2
(45) Date of Patent: Nov. 15, 2022

(54) INFRARED DETECTION DEVICE

(71) Applicant: Centre National De la Recherche Scientifique, Paris (FR)

(72) Inventors: Yannick De Wilde, Paris (FR); Elodie Perros, Clamart (FR); Valentina Krachmalnicoff, Paris (FR); Rémi Carminati, Maisons-Laffitte (FR); Albert-Claude Boccara, Paris (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 693 days.

(21) Appl. No.: 16/472,147

(22) PCT Filed: Dec. 21, 2017

(86) PCT No.: PCT/FR2017/053799
§ 371 (c)(1),
(2) Date: Jun. 20, 2019

(87) PCT Pub. No.: WO2018/115778
PCT Pub. Date: Jun. 28, 2018

(65) Prior Publication Data
US 2021/0302341 A1 Sep. 30, 2021

(30) Foreign Application Priority Data
Dec. 23, 2016 (FR) ...................... 1663273

(51) Int. Cl.
*G01N 25/18* (2006.01)
*G01J 3/10* (2006.01)
(Continued)

(52) U.S. Cl.
CPC .............. *G01N 25/18* (2013.01); *G01J 3/108* (2013.01); *G01J 5/0003* (2013.01);
(Continued)

(58) Field of Classification Search
None
See application file for complete search history.

(56) References Cited

U.S. PATENT DOCUMENTS

| 4,947,034 A | 8/1990 | Wickramasinghe et al. |
| 5,093,580 A | 3/1992 | Sting |

(Continued)

FOREIGN PATENT DOCUMENTS

| JP | 9-292282 A | 11/1997 |
| JP | 2005-257414 A | 9/2005 |

(Continued)

OTHER PUBLICATIONS

Elhadj, et al., "Combined Infrared Thermal Imaging and Laser Heating for the Study of Materials Thermophysical and Processing Properties at High Temperatures", Journal Critical Reviews in Solid State and Materials Sciences, vol. 39, No. 3, pp. 175-196, Mar. 28, 2014.

(Continued)

*Primary Examiner* — Erica S Lin
(74) *Attorney, Agent, or Firm* — BakerHostetler

(57) ABSTRACT

An infrared-detecting device, includes an infrared detector configured to emit a signal representative of the thermal radiation of a hotspot, and a light source configured to emit an incident beam, preferably in a window of UV or visible wavelength. The infrared-detecting device furthermore comprises a synchronizing device connected to the light source and to the infrared detector or to the processing module, and configured to emit a synchronization signal, the infrared detector being configured to be activated in a preset time window depending on said synchronization signal.

9 Claims, 3 Drawing Sheets

(51) Int. Cl.
  *G01J 5/00*    (2022.01)
  *G01J 5/0806*  (2022.01)
  *G01J 5/08*    (2022.01)
  *G01N 25/72*   (2006.01)
  *G02B 21/00*   (2006.01)

(52) U.S. Cl.
  CPC ........... *G01J 5/0806* (2013.01); *G01J 5/0896* (2013.01); *G01N 25/72* (2013.01); *G02B 21/0004* (2013.01)

(56) References Cited

U.S. PATENT DOCUMENTS

| 7,977,636 | B2  | 7/2011  | Raschke |
| 8,873,140 | B2  | 10/2014 | Juette et al. |
| 2005/0259252 | A1 | 11/2005 | Hillenbrand et al. |
| 2010/0044586 | A1* | 2/2010 | Duhr .................. C12Q 1/68 977/773 |
| 2013/0102865 | A1* | 4/2013 | Mandelis ........... G01N 21/1702 600/328 |
| 2013/0134310 | A1 | 5/2013 | Furstenberg et al. |
| 2018/0045574 | A1* | 2/2018 | Engelbart ............. G01J 5/0066 |

FOREIGN PATENT DOCUMENTS

| JP | 2007-67423 A | 3/2007 |
| WO | 2008/143817 A1 | 11/2008 |

OTHER PUBLICATIONS

Andor, "An Overview of Spinning Disk Confocal Microscopy", http://www.andor.com/learning-academy/spinning-disk-confocal-a-technical-overview.

Griffiths et al., "Fourier Transform Infrared Spectrometry", (John Wiley and Sons, Hoboken, New Jersey, 2007), 2nd ed.

Huth, et al., "Infrared-spectroscopic nanoimaging with a thermal source", Nature Materials vol. 10, 352 (2011).

Jones, et al., "Thermal Infrared Near-Field Spectroscopy", Nano Letters, vol. 12, 1475-1481 (2012).

Dazzi, et al., "AFM-IR: Combining Atomic Force Microscopy and Infrared Spectroscopy for Nanoscale Chemical Characterization", Applied Spectroscopy vol. 66, 1365-1384 (2012).

* cited by examiner

INFRARED DETECTION DEVICE

CROSS-REFERENCE TO RELATED APPLICATIONS

This application is a National Stage of International patent application PCT/FR2017/053799, filed on Dec. 21, 2017, which claims priority to foreign French patent application No. FR 1663273, filed on Dec. 23, 2016, the disclosures of which are incorporated by reference in their entirety.

FIELD OF THE INVENTION

The present invention relates to the field of super-resolution detection in the infrared, whether it be for imaging (microscopy), thermography or for the spectroscopy of a sample.

BACKGROUND

For the sake of conciseness, the term "infrared" is understood, in the present invention, to mean any electromagnetic field the frequency or, equivalently, wavelength of which is comprised in the infrared band (including the near and far infrared), the terahertz band or the microwave band.

The infrared spectrum is very rich in information (molecular vibrations, phonons, plasmons in semiconductors, thermal emissions, etc.). It therefore allows a sample to be characterized.

Infrared spectroscopy relates to the study of the spectrum of infrared radiation reflected, transmitted or absorbed by a sample, or produced by thermal radiation from the surface thereof, such as described in the book Peter R. Griffiths and James A. De Haseth, *Fourier Transform Infrared Spectrometry* (John Wiley and Sons, Hoboken, N.J., 2007), 2nd ed. As also described in this work, microspectroscopy measurements that aim to map the spectrum at the surface of the sample make use of an infrared microscope coupled to an infrared spectrometer: the sample may be placed on a computer-controlled device for translating it along 2 orthogonal axes and the spectrum measured for each of a number of scanning steps, or alternatively the sample may remain static and its spectrum be measured using a multi-channel matrix-array detector.

In this field, conventional instruments such as infrared microscopes and infrared spectrometers are known, these instruments having a spatial resolution of about 10 microns because of the diffraction limit, which is directly related to the observation wavelength, this being a substantial limitation of these instruments.

Super-resolution techniques, whether applied to microscopy, spectroscopy or microspectroscopy, allow the diffraction limit to be circumvented with a view to obtaining information with a spatial resolution better than the wavelength.

Up to now, to circumvent the resolution limit in the infrared, it has been necessary to use a scanning near-field optical microscope (SNOM) that employed as a scannable local probe an atomic force microscope (AFM) tip, the probe being placed in contact with the surface of the sample. This allowed measurements to be taken in the infrared with a resolution close to that of the topography measured by AFM. For example, the publication F Huth, M Schnell, J Wittborn, N Ocelic, & R Hillenbrand, "Infrared-spectroscopic nano-imaging with a thermal source", NATURE MATERIALS Vol. 10, 352 (2011) presents such a device using the radiation of an external thermal source scattered by the tip of an AFM in contact with the surface of the sample. The publication A C Jones, M B Raschke, "Thermal Infrared Near-Field Spectroscopy", NANO LETTERS, Vol. 12, 1475-1481 (2012), presents an apparatus that uses a heated AFM tip that locally increases the thermal emission of the sample, and scatters said emission towards an infrared microspectroscopy device.

Such microscopes are effective but expensive and require a scannable local probe to be placed in contact with the surface of the sample to be studied, in order to be able to scatter the electromagnetic field excited using an exterior source.

An alternative method to SNOM, called IR-AFM, consists in using a thermomechanical effect on an AFM tip. In this case, infrared radiation is absorbed by the sample and the thermal expansion that results is measured via the amplitude of the oscillation of a cantilevered AFM tip placed in contact with the surface of the sample. It is once again a question of a technique that requires contact with the sample, that requires a modulated infrared source to be employed, and that is also very expensive.

SNOM and IR-AFM, as for example described in the documents U.S. Pat. No. 4,947,034, US20050259252, U.S. Pat. No. 7,977,636 and WO2008143817, or indeed in the publication A Dazzi, C B Prater, Q Hu, D B Chase, et al., "AFM-IR: Combining Atomic Force Microscopy and Infrared Spectroscopy for Nanoscale Chemical Characterization", APPLIED SPECTROSCOPY Vol. 66, 1365-1384 (2012), are very expensive because they require an AFM and an exterior source the spectrum of which is broad in the infrared.

Furthermore, they are contact methods, which are difficult to implement, and which are limited to investigations of sample surfaces.

The so-called ATR method, ATR standing for attenuated total reflectance, such as for example described in the documents U.S. Pat. Nos. 8,873,140 and 5,093,580, is also known. In infrared microscopy, it is possible to increase the resolution of a microscope by placing the sample in contact with an ATR cell. Apart from the drawback of requiring contact with the sample, as in the SNOM and IR-AFM methods, the increase in resolution is limited by the value of the refractive index n of the ATR cell, which is generally made of germanium (n=4) or of silicon (n=3.4).

The present invention aims to circumvent these constraints.

SUMMARY OF THE INVENTION

In this context, and more precisely, a first subject of the invention is an infrared-detecting device, comprising:
  an infrared detector (50) configured to emit a signal (S1) representative of the thermal radiation of wavelength (L_F2) emitted by a set of at least one hotspot (21),
  a light source (10) configured to emit an incident beam (F1) of wavelength (L_F1) shorter than the wavelength (L_F2), preferably in a window of UV or visible wavelength,
  a device (11) for focusing said incident beam (F1), the focusing of said incident beam (F1) producing a set of at least one focal spot, each focal spot having a size smaller than that of the wavelength (L_F2) of the detected infrared thermal radiation, each focal spot being capable of generating a respective hotspot (21) when said focal spot is located on a holder or a sample, and the spreading rate of which over said holder or said sample is known, a processing module (60), connected to at least one infrared detector (50), a synchronizing device (70) connected to at least one among said light source (10), said infrared detector (50) and said processing module (60), the synchronizing device (70) being configured to emit a synchronization signal (SYNC), the infrared detector (50) or the processing module being configured to measure the signal (S1) in a time window (FT) that is preset depending on said synchronization signal (SYNC) and the spreading rate of the hotspot.

It is essentially characterized in that the processing module (60) is configured to measure the signal (S1) in a time window (FT) the value of which multiplied by the value of the spreading rate of the hotspot (21) is lower than the value of the infrared wavelengths (L_F2) of the thermal radiation emitted by said hotspot (21).

The signal (S1) may be an electrical signal or an optical signal.

The connection between the synchronizing device (70), the light source (10), the infrared detector (50) and the processing module (60) may be electrical and/or optical, a fast photodiode for example.

In one embodiment, the processing module (60) is configured to measure the signal (S1) in a time window (FT) the value of which multiplied by the value of the spreading rate of the hotspot (21) is lower than the value of the infrared wavelengths (L_F2) of the thermal radiation emitted by said hotspot (21).

By virtue of this feature, the size of the one or more hotspots thus produced is smaller than the infrared wavelength (L_F2) of the thermal radiation.

Preferably, the wavelength (L_F2) of the thermal radiation emitted by a set of at least one hotspot (21) is comprised in the mid-infrared (3 microns to 50 microns) and the far infrared (50 microns to 1000 microns).

Trials have been carried out with a detector of spectral range comprised between 7 and 12 microns.

In one embodiment, the light source (10) is a pulsed source configured to emit a train of at least one pulse when it is activated, and the synchronization signal (SYNC) is emitted depending on said train of at least one pulse.

Preferably, the processing module is configured to sample the signal (S1) corresponding to the thermal radiation reaching the infrared detector (50) directly after the train of at least one pulse, for a length of time such that the spread of the hotspot is smaller than the infrared wavelength of the detected thermal radiation.

In one embodiment, the light source (10) is a continuous-wave or pulsed light source that is time modulated at a modulation frequency (Fmod), the infrared-detecting device furthermore comprising a demodulator configured to demodulate the signal (S1) output from the infrared detector (50) at the modulation frequency (Fmod) or a harmonic of this frequency.

In one embodiment, the infrared detector (50) comprises at least one among:

a single-channel infrared detector or an infrared imager (51), and an infrared spectrometer (52).

By "infrared imager" what is meant is a multi-channel infrared detector typically formed by a matrix array of infrared detectors. With a multi-channel detector, it is possible to achieve a super-localization of the hotspot, i.e. the hotspot produces a diffraction-limited Airy disk that may be sampled by a plurality of pixels of the infrared imager. The center of the disk may thus be determined with a better precision than the infrared wavelength by fitting a two-dimensional Gaussian function to the profile of this disk, such as known in photo-activated localization microscopy (PALM).

Provision may furthermore be made for an optical objective (40) configured to collect the thermal radiation (F2) of a hotspot (21) and to transfer it to said infrared detector (50).

Provision may be made for the processing module (60) to be configured to measure the signal (S1) in a time window (FT) the value of which multiplied by the value of the spreading rate of the hotspot (21) is lower than the value of the infrared wavelength (L_F2) of the thermal radiation emitted by said hotspot (21).

Provision may furthermore be made for a sample holder (30), the device possibly adopting either one of the following configurations:

a reflection configuration in which the light source (10) and the infrared detector (50) are placed on the same side of the holder (30), and a transmission configuration in which the light source (10) and the infrared detector (50) are placed on either side of the holder (30).

Provision may furthermore be made for:

a scanning device configured to modify the relative position of the focal point of the beam (F1) and of the sample holder (30).

Provision may furthermore be made for a sample (20), said sample optionally being comprised in a microfluidic channel (23) of a microfluidic cell, said microfluidic cell comprising an external layer (22) that is transparent at the excitation wavelength (L_F1) of the incident beam (F1), and an internal layer (24) that is transparent at the wavelength (L_F2) of the thermal radiation (F2).

According to another subject thereof, the invention relates to an infrared-detecting method capable of employing the device according to the invention, the method comprising steps of:

positioning a sample (20) on a holder (30), activating a light source (10), focusing the beam (F1) of a light source (10) into a set of at least one focal zone (21) the position of which is preset and comprised in said sample (20), on a surface of said sample, or at the interface between said sample (20) and said holder (30), in order to generate a local increase in the thermal radiation (F2) emitted by said sample (20) or said holder (30), collecting said thermal radiation (F2) emitted by each focal zone (21) of said set in an optical objective (40) that is combined with an infrared detector (50) comprising at least one among:

a single-channel infrared detector or an infrared imager (51), and an infrared spectrometer (52), generating an output signal (S1) representative of the thermal radiation (F2) detected by said infrared detector (50), synchronizing said infrared detector (50) and said light source (10), and measuring the output signal (S1) in a preset time window (FT) starting a preset time after the activation of the light source (10).

Provision may furthermore be made for the method to comprise steps of:

time modulating said continuous-wave or pulsed light source (10) at a modulation frequency (Fmod), and demodulating the signal (S1) output from the infrared detector (50) at the modulation frequency (Fmod) or one of its harmonics with a demodulator of the infrared-detecting device, and wherein preferably, if the light source (10) is a pulsed source, it is configured to generate a pulse train comprising a set of rising edges and falling edges, the step of activating the infrared detector (50) then consisting in activating the infrared detector (50) at the latest on the last falling edge of the pulse train.

It is also possible to make provision to apply a demodulation of the signal (S1) with a synchronous-detection technique instead of a time window if the light source (10) is a pulsed light source.

Provision may be made for the step consisting in measuring the output signal (S1) in a preset time window (FT) to comprise one of the following operations:

activating the infrared detector (50) in a preset time window (FT), starting a preset time after activation of the light source (10), and keeping the infrared detector (50) active and sampling only that portion of the output signal (S1) which is produced in a preset time window (FT), starting a preset time after the activation of the light source (10).

Provision may be made, if the light source (10) is a pulsed source configured to generate a pulse train comprising a set of rising edges and falling edges, for the step of activating the infrared detector (50) to then consist in activating the infrared detector (50) at the latest on the last falling edge of the pulse train.

In the case where the detector is constantly active, the step of sampling the output signal (S1) in a preset time window (FT) starts at the latest on the last falling edge of the pulse train.

By virtue of the present invention, it is possible to use a pulsed or modulated light source of short wavelength (L_F1) to produce a hotspot the infrared thermal radiation of which, which is highly localized to a zone of size smaller than the wavelength (L_F2) that it emits, is measured. It is therefore a contactless solution that differs in this respect from prior art solutions.

Furthermore, the present invention not only makes it possible to probe the infrared properties of the surface of the sample, but also to probe under the surface of the sample, this not being possible with SNOM probes.

The present invention may exploit the infrared thermal radiation emitted from a hotspot of size smaller than (L_F2) created on the sample. The sample is therefore its own source of infrared radiation, and thus the present invention does not require an external infrared source. Likewise, the present invention may exploit the infrared thermal radiation emitted from a hotspot created under the sample. In this case, the holder is the source of infrared radiation, and thus again the present invention does not require an external infrared source.

Furthermore, the infrared radiation generated by the sample has a broad spectrum and intrinsically contains all the optical frequencies that are of interest to the characterization of the sample, this being very advantageous with respect to SNOM probes that require an exterior infrared source the spectrum of which has an overlap with the optical frequencies of interest of the sample to be provided.

The present invention enables super-resolution imaging, i.e. imaging the spatial resolution of which is better than the wavelength of the measured thermal radiation (L_F2). In the present case, by adjusting the time window, it is possible to make the resolution equal to the size of the focal spot.

Moreover, the present invention allows the concept of super-resolution microscopy to be generalized to longer wavelengths (mid-infrared, terahertz frequencies) and works without markers because the detected signal comes from the infrared thermal radiation of the sample itself, this distinguishing the present invention from super-resolution fluorescence microscopy technologies, which are furthermore restricted to the visible and near-infrared spectral domains.

The present invention is very cheap and makes it possible to probe under the surface of a sample since it is a contactless technique.

Other features and advantages of the present invention will become more clearly apparent on reading the following description, which is given by way of illustrative and nonlimiting example with reference to the appended figures.

DETAILED DESCRIPTION

Figure 1:
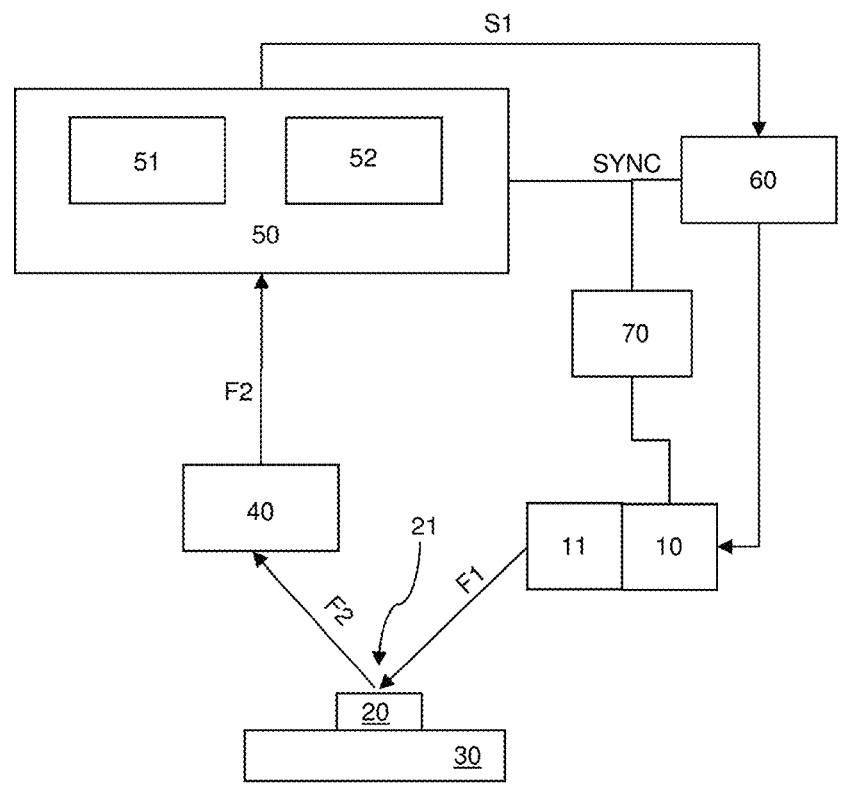
FIG. 1 illustrates one embodiment of a device according to the invention.

FIG. 1 illustrates one embodiment of the device according to the invention.

The device comprises a light source 10, which is configured to generate an exciting beam of incident light F1, which is also called the signal F1.

The light source 10 is a time-modulated or pulsed light source. For example, the incident light beam F1 is a laser beam and the light source 10 is a laser that emits in the visible spectrum. For the sake of conciseness, by "pulse" what is meant is a single pulse or a pulse train.

The light beam F1 is preferably of short wavelength. Typically, the wavelength is comprised in the visible window or in the UV window. Typically, provision is made for the wavelength L_F1 of the beam F1 to be very much shorter than the wavelength L_F2 of the thermal radiation F2 of a sample, as described below. By "very much shorter" what is meant is that the ratio between the wavelength L_F1 of the beam F1 and the wavelength L_F2 of the thermal radiation is lower than a preset threshold value. Typically, the threshold value is higher than or equal to 10.

In the context of the present invention, for the sake of conciseness, by "the" wavelength L_F2, what is meant is the average wavelength of the spectrum of the thermal radiation emitted by a hotspot 21.

Preferably, L_F2 is beyond the mid-infrared, i.e. longer than 2.5 μm.

The sample 20 is for example placed on a holder 30, typically a holder 30 of a microscope (not illustrated).

The sample 20 is placed in an environment at a temperature that is preferably substantially constant, typically room temperature. When the light source 10 is not activated, the internal heat of the sample 20 in this case generates thermal radiation F2, also called signal F2, the intensity of which is substantially constant.

When the light source 10 is active, the incident beam F1 is focused on a focal zone of the sample 20, on the external or internal surface thereof, or in the interior thereof, for example by a device for optically focusing the incident beam 11, such as an optical objective, which is optionally integrated into the light source 10.

It is possible to focus the beam F1 on a focal zone the equivalent diameter of which is smaller than the wavelength L_F2 of the thermal radiation F2, also called the beam F2 or signal F2. In the present case, the equivalent diameter of the focal zone is about 1 micron, and the wavelength L_F2 is about 10 microns.

Focusing the incident beam F1 on the sample generates by absorption a local rise in the temperature thereof.

For a beam F1 of given intensity, the smaller the focal zone, the larger the local rise in temperature.

Under the effect of the beam F1, the local temperature of the focal zone increases and becomes greater than that of the rest of the sample, provided that said sample is absorbent at the wavelength of the incident beam F1, and thus defines a hotspot 21.

The hotspot 21 may be singular. The corresponding single focal point is typically achieved by making a broad exciting laser beam pass through a lens.

It is also possible to create a set of hotspots simultaneously and to perform the detection of the thermal radiation in parallel, for example by virtue of a multi-channel detector, this allowing the measurement of the signal F2 to be performed in parallel and analysis time to be decreased.

A plurality of hotspots may be multiplexed by making a broad exciting laser beam pass through a plurality of microlenses. This principle is used in confocal fluorescence microscopy with the so-called SDCLM (spinning-disk confocal laser microscopy) method and for example described at the address http://www.andor.com/learning-academy/spinning-disk-confocal-a-technical-overview. In this case, instead of using a single laser spot that scans the surface of the sample, a plurality of spots scan simultaneously by virtue of the use of a rotating disk provided with microlenses, the laser simultaneously illuminating a set of microlenses.

The local rise in the temperature of the sample around said hotspot 21 then produces an increase in the thermal radiation F2 in the infrared of the sample, the size of said increase, which occurs around said hotspot, corresponding to the local increase in the thermal radiation of the sample.

The position of the hotspot 21 is known and its spatial extent corresponds at least to the focal zone of the incident beam F1.

Over time, after a pulse of the incident beam F1, the heat diffuses through the sample 20 around the hotspot 21 and thus tends to spread.

An optical objective 40, known per se, collects the thermal radiation F2 from the hotspot 21 and then directs said beam F2 to at least one infrared detector 50, in the present case one at least among:

a single-channel infrared detector or an infrared imager 51, and an infrared spectrometer 52.

The infrared detector 50 then generates an output signal S1, which is representative of the thermal radiation F2 and which is sent to a processing module 60.

The processing module 60 is synchronized with the light source 10, in the present case by virtue of electrical pulses sent by the light source 10 to the processing module 60 on each pulse of the incident beam F1.

However, and especially if the light source 10 is a continuous-wave source, there is a risk of a thermal-diffusion effect occurring in or on the sample 20. Thus, because of the thermal diffusion constant inherent to any sample, the hotspot generated by focusing the light source 10 tends to get larger with time.

Time Windowing

To avoid or at least to limit this effect, provision is made to implement time windowing, or temporal selection, also known as boxcar integration, which consists in activating the infrared detector 50 or in selecting the signal (S1) that it produces in a preset time window FT, starting a preset time after the activation of the light source 10.

The duration of measurement of the thermal radiation F2, which corresponds to the duration of activation of the infrared detector 50 or to the duration of selection of the signal S1 that it produces, also called "window width", allows the optical spatial resolution to be modified.

Because of thermal diffusion in the sample, the wider the window, the poorer the spatial resolution, this decreasing the ability to observe small details of the sample. Likewise, the longer the time between the initialization of the time window FT and the activation of the light source 10, the poorer the spatial resolution. To optimize the results, it is therefore advantageous to initialize or activate the time window FT as soon as possible after the activation of the light source, and to limit the window width, each of these actions allowing the effect of thermal diffusion to be limited.

Preferably, the time window FT is initialized at the latest at the end of the activation of the light source 10 and, in the present case a pulsed light source 10, at the latest on the last falling edge of the pulse train.

Preferably, the window width is slaved to the thermal diffusion constant of the sample. In particular, the window width is preferably inversely proportional to the thermal diffusion constant of the sample.

In the present case, provision is made for a device 70 synchronizing the light source 10 and the infrared detector 50 or processing module 60. The synchronizing device 70 may be integrated into the processing module 60.

In one embodiment, the light source 10 is a pulsed source that generates a heating pulse that is highly localized in space (hotspot 21) and in time (pulse).

For example, the light source 10 is a UV laser source that generates pulses each of 1 nanosecond, at a maximum repetition rate of 1 kHz.

Preferably, the thermal radiation of the hotspot F2 is collected shortly after the heating pulse of the light source 10 is emitted. By "shortly after" what is meant is at the latest at a preset time after the heating pulse is emitted, i.e. after the light source is activated.

Thus, the thermal diffusion effect is extremely limited and the zone of the sample that actually emits the thermal radiation corresponds substantially to the hotspot 21.

For example, the infrared detector 50 is activated in a detection window FT the duration of which is preset and the temporal position of which is slaved to the end of a heating pulse. Typically, the detection window FT is activated at the latest after the last falling edge of a heating pulse train, and the window width depends on the nature of the sample.

In one embodiment, the light source 10 is a continuous-wave source, the intensity of which is time modulated, for example by a sinusoidal function, at a modulation frequency Fmod, preferably a high frequency. Preferably, the modulation frequency Fmod is higher than or equal to a frequency f for which the thermal diffusion length LDT substantially corresponds to the size of the hotspot 21, where $$LDT=\sqrt{(DT/\pi \cdot f)}$$

where DT is the thermal diffusivity.

By virtue of the modulation of the signal F1, the signal F2 output from the hotspot is itself also modulated at the same modulation frequency Fmod or at one of its harmonics. In the present case, the modulation of the signal F1 may be produced using an acousto-optic modulator.

Provision is then made to detect the thermal radiation of a hotspot using a synchronous detection technique, i.e. provision is made to capture the infrared signal F2 with the infrared detector 50 at the modulation frequency Fmod or at one of its harmonics. Specifically, in this case there is a relationship between the spatial extent of the hotspot due to the thermal diffusion and the modulation frequency.

When output by the infrared detector 50, the signal S1 may then be demodulated, typically by virtue of a demodulator (not illustrated). The demodulator may be integrated into the processing module 60. In the present case, the demodulator comprises a lock-in amplifier.

Thus, in either one of the above embodiments, the signal F2 may be detected either in the time regime, or in the frequency regime.

Scanning

Provision may be made to scan the sample point by point, according to a preset number of hotspots, and to measure the intensity of the signal F2 at each point.

The scan is carried out by modifying the relative position of the focal point of the beam F1 and either the sample or its holder. For example, it is possible to modify the position of the focal point of the beam F1, the position of the sample (or of its holder) remaining unchanged; or to modify the position of the sample (or its holder), the position of the focal point of the beam F1 remaining unchanged.

It is thus possible to obtain an image of the infrared thermal radiation of the sample point by point with a resolution determined by the time window.

The signal F2 may also be transmitted to the input of an infrared spectrometer 52, for example a Fourier-transform infrared spectrometer.

Infrared imaging and infrared spectrometry are combinable.

For example, provision may initially be made to produce an infrared image of a sample by scanning, then to select in said infrared image a set of at least one hotspot, the position of which is known, and that is of interest. By virtue of this analysis of the infrared image, it is then possible to perform a spectroscopic analysis of said sample for at least one selected hotspot.

It is also advantageously possible to simultaneously produce an infrared image of a sample by scanning point by point, and to perform an infrared spectroscopic analysis of each hotspot, this allowing a very rich infrared analysis of said sample to be obtained since, for each hotspot, both the thermal image of said hotspot and, in another dimension, the energy (wavelength) dependency of the signal F2 detected for said hotspot are obtained.

The present solution may have two configurations, which are described below. Whatever the first or second configuration, provision may be made for one of the following 3 variants.

Figure 2:
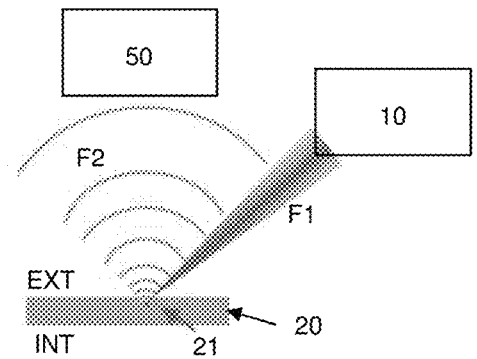
FIG. 2 illustrates a reflection configuration of a device according to the invention.

As a first variant, illustrated in FIG. 2, the focal point of the beam F1 is placed on the external surface of the sample. This type of configuration is close to the principle of SNOM probes, except that the solution proposed here is contactless with respect to the sample.

Figure 3:
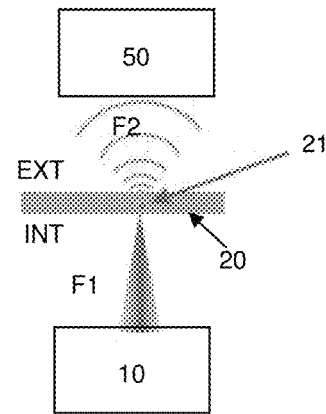
FIG. 3 illustrates a transmission configuration of a device according to the invention.
Figure 5:
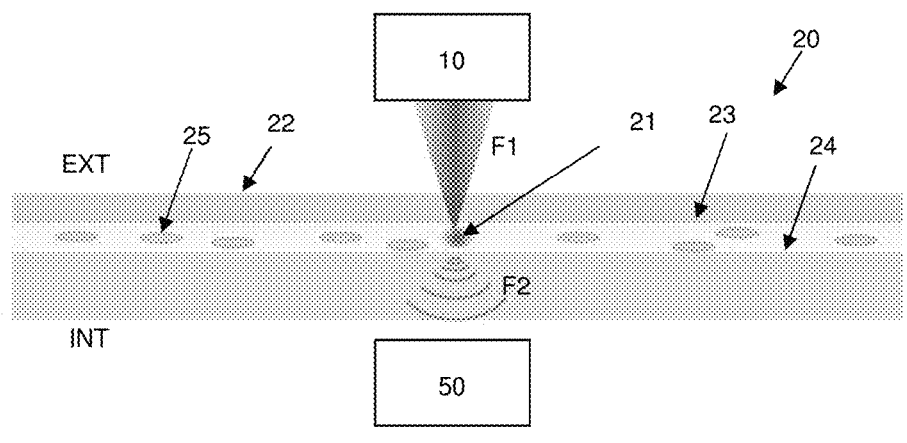
FIG. 5 illustrates a transmission configuration of a device according to the invention.

As a second variant, illustrated in FIG. 3 and FIG. 5, the focal point of the beam F1 is placed in the interior of the sample.

Figure 4:
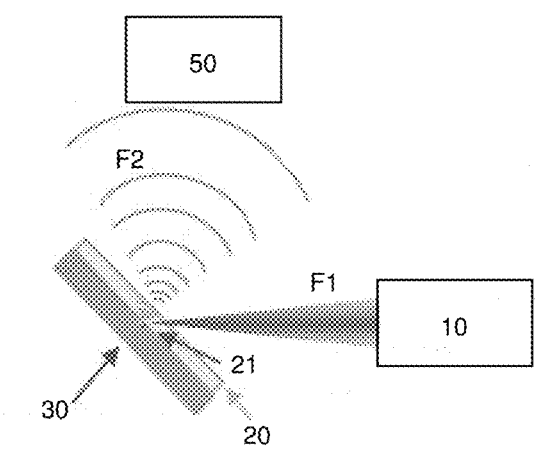
FIG. 4 illustrates a reflection configuration of a device according to the invention.

As a third variant, illustrated in FIG. 4, the focal point of the beam F1 is placed on the internal surface of the sample.

In a first configuration, called the reflection configuration, which is illustrated in FIG. 2 and in FIG. 4, provision is made for the light source 10 and the infrared detector 50 to be placed on the same side of the sample, in the present case on the external side EXT of the sample 20, the internal side INT for example making contact with a holder.

In FIG. 2, the sample 20 is absorbent at the wavelength L_F1 of the incident beam F1. The sample 20 is the source of the infrared radiation F2.

In FIG. 4, the sample 20 is transparent at the wavelength L_F1 of the incident beam F1; and the holder 30 (or substrate) is absorbent at the wavelength L_F1 of the incident beam F1. In this case, the holder 30 is the source of the infrared radiation F2 and this radiation is partially absorbed by the sample 20. Preferably, the sample is placed on the holder 30, so that they make contact with each other. The sample 20 is absorbent at the infrared thermal wavelength produced by the holder 30, which is detected by the infrared detector 50. Provision may be made to directly detect the infrared spectrum emitted by the holder 30 and partially absorbed by the sample 20. Provision may also be made to perform a differential detection between the detection made by the infrared detector 50 in the presence of the sample and the detection made by the infrared detector 50 in the absence of said sample.

In a second configuration, called the transmission configuration, which is illustrated in FIG. 3 and in FIG. 5, provision is made for the light source 10 and the infrared detector 50 to be placed on either side of the sample.

In this case, the interface between the sample and the light source is transparent to the excitation wavelength L_F1 of the incident beam, and the interface between the sample and the infrared detector 50 is transparent at the wavelength L_F2 of the thermal radiation. This type of configuration may be advantageous when the sample must be covered by a layer. Specifically, in a reflection configuration, the material of the layer 22 used to cover the sample must be transparent both to the excitation wavelength L_F1 and transparent to the wavelength of the thermal radiation L_F2. In contrast, in transmission configuration, it is possible to achieve two different interfaces, each interface being transparent to one respective wavelength.

This configuration advantageously allows a sub-surface image of a sample to be produced, this not being possible with SNOM probes.

FIG. 5 shows a sample 20 taking the form of a microfluidic cell comprising an external layer 22 that is transparent to the excitation wavelength L_F1, a microfluidic channel 23 for example comprising biological cells 25, and an internal layer 24 that is transparent to the wavelength L_F2 of the thermal radiation.

In the present case, the beam F1 is focused on a cell 25 in the microfluidic channel. The microfluidic cell is illuminated from one side (external site EXT) in the visible or UV in order to create the hotspot 21 and placed on a substrate 24 that is transparent in the IR on the opposite side (internal side INT) through which the emitted thermal radiation F2 is detected.

Which of the configurations is chosen depends for example on the nature of the sample, in particular on its absorption at the two wavelengths L_F1 and L_F2.

Experimental results

Figure 6:
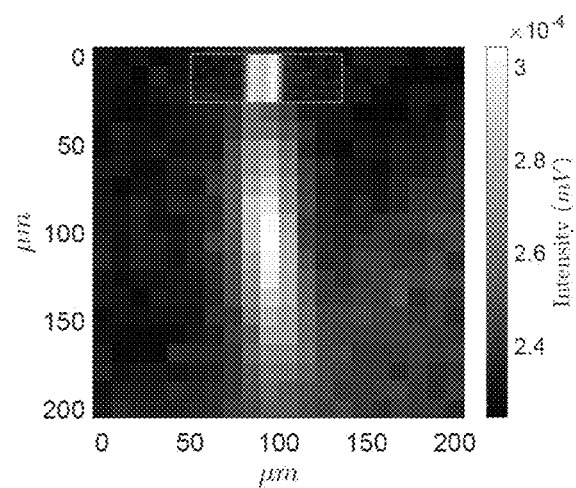
FIG. 6 illustrates a conventional infrared microscopy image comprising, in the insert, a super-resolution infrared image of a glass fiber, in the present case of 13 microns thickness, obtained according to the invention.
Figure 7:
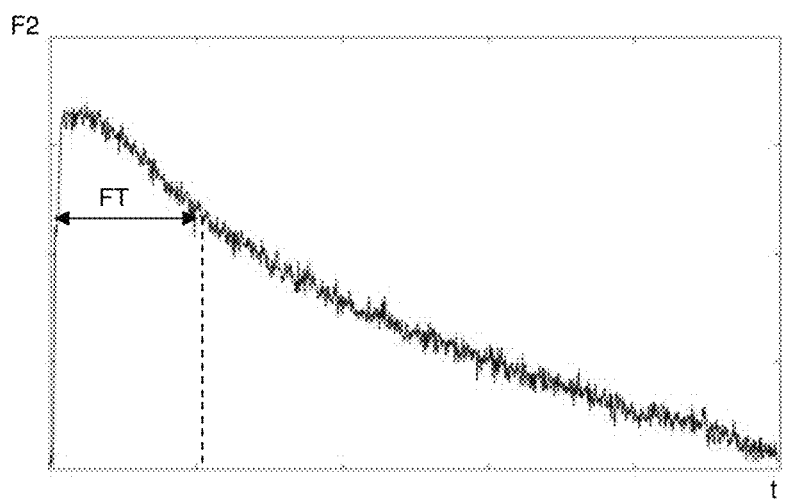
FIG. 7 illustrates a curve of the decline of the intensity of the infrared signal F2 as a function of time.

Trials have been carried out by the applicant and are illustrated in FIGS. 6 to 8.

FIG. 7 illustrates a curve of the decline of the intensity of the infrared signal F2 as a function of time t, after application of a heat pulse to a sample, in the present case a glass fiber, at t=0. Under the effect of the pulse, the local temperature of the sample very rapidly increases to a maximum, then declines in a decreasing curve that depends on the diffusion of heat through the sample, which is related to its nature and to its geometry. It is therefore preferable to provide a time window F2 that starts with the pulse of the light source 10, this guaranteeing that the intensity peak of the signal F2 will be detected.

Preferably, provision is made to limit the duration of the time window to a preset duration, for example at the latest to the value for which the thermal diffusion length is of the size of the focal point of the incident beam F1, this making it possible to limit the effects of thermal diffusion through the sample, and therefore to limit the extent of the source of the thermal radiation, to preserve an extent of the source of thermal radiation smaller than the thermal wavelength L_F2, and to obtain a better signal-to-noise ratio.

By virtue of these features, it is possible to obtain, with an infrared imager, so-called super-resolution images, as illustrated in FIG. 6.

FIG. 6 compares a conventional infrared microscopy image and, in the insert (in the frame in the top portion of FIG. 6) a super-resolution infrared image of a glass fiber. In the present case, the time window was 50 μs after the heating pulse and the glass fiber was of 13 microns thickness. Each point of the image of the insert of FIG. 6 is an intensity value of the infrared signal F2 averaged over the time window FT as a function of position.

Figure 8A:
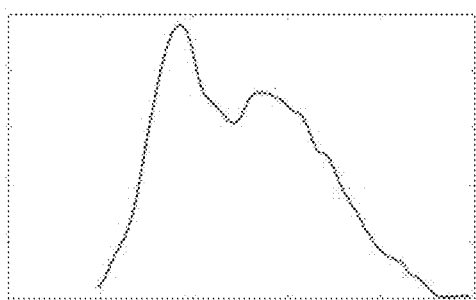
FIG. 8A illustrates the infrared spectrum obtained on a glass sample by virtue of a spectrometer according to the invention.
Figure 8B:
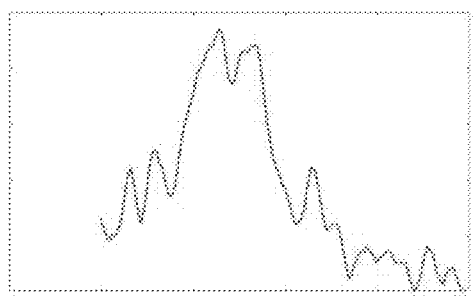
FIG. 8B illustrates the infrared spectrum obtained on a PDMS sample by virtue of a spectrometer according to the invention.

FIG. 8A and FIG. 8B illustrate the infrared spectra obtained on a glass sample and a polydimethylsiloxane (PDMS) sample, respectively, said spectra being obtained by virtue of a spectrometer according to the invention.

The present invention allows contactless characterization of infrared optical properties at a scale smaller than the thermal wavelength L_F2.

As mentioned above, the light source 10 is combined with at least one among an electronic synchronizing device 70 and the processing module 60, this allowing the signal S1 output from the infrared detector used to be acted upon. This allows the diffusion of the spot of heat around the hotspot of the sample that contributes to the signal F2 to be limited. Thus, infrared thermal radiation from the sample coming from a zone of a size smaller than the characteristic wavelength L_F2 of this radiation is detected. This zone may be scanned over the surface of the sample in order to take super-resolution infrared imaging and spectroscopy measurements.

The synchronization may be performed in real-time or post-processing, in this case by virtue of the processing module 60, this allowing the infrared detector 50 to be activated independently of the activation of the light source 10.

Moreover, provision may also be made to deposit, on the surface of the sample, nanoparticles that play the role of local scatterers of the near-field thermal radiation.

As seen above, the sample must absorb in a region of the spectrum in which the wavelength L_F1 is shorter than that of the detected thermal radiation L_F2, so as to be able to create a hotspot 21 of sub-wavelength size. Otherwise, it is possible to place the sample on a substrate and form the hotspot at the interface between this substrate and the sample. For example, if the sample is placed on a simple glass slide, it is possible to create the hotspot at the interface with a UV laser beam because the latter is highly absorbed by glass.

The present invention may be implemented in infrared thermography, in particular to contactlessly study heat transfer in the dynamic regime following a brief (or modulated) and point-like heat pulse that may be scanned over the surface of the sample. By scanning the infrared detector with respect to the hotspot, it is also possible to image the spread of the heat at various times after the heat pulse, and thus to obtain a map of local differences in thermal conductivities, for example.

Heat-transfer anomalies allow defects in a structure to be detected nondestructively, this possibly being useful for samples such as biological tissues, polymers, composite materials, etc.

NOMENCLATURE

F1 Incident beam, of excitation wavelength L_F1
F2 Thermal emission of a hotspot, of wavelength L_F2
S1 Signal output from the infrared detector
10 Light source
11 Device for optically focusing the incident beam
20 Sample
21 Hotspot
22 Layer transparent to the excitation wavelength L_F1
23 Microfluidic channel
24 Interface transparent to the wavelength L_F2
25 Biological cell
30 Sample holder
40 Optical device for collecting the thermal radiation of a sample (optical objective)
50 Infrared detector
51 Infrared imager
52 Infrared spectrometer
60 Processing module
70 Synchronizing device

The invention claimed is:

1. An infrared-detecting device, comprising:
an infrared detector configured to emit a signal representative of the thermal radiation of wavelength emitted by a set of at least one hotspot, a light source configured to emit an incident beam of wavelength shorter than the wavelength, in a window of UV or visible wavelength, a device for focusing said incident beam, the focusing of said incident beam producing a set of at least one focal spot, each focal spot having a size smaller than that of the wavelength of the detected infrared thermal radiation, each focal spot being capable of generating a respective hotspot that spreads on a holder or a sample when said focal spot is located on said holder or said sample, and a rate that each respective hotspot spreads over said holder or said sample is known, a processing module, connected to at least one infrared detector, and a synchronizing device connected to at least one among: said light source, said infrared detector and said processing module, the synchronizing device being configured to emit a synchronization signal, wherein the infrared detector or the processing module being configured to measure the signal in a time window that is preset depending on said synchronization signal and the rate that each respective hotspot spreads over said holder or said sample, and wherein the processing module is configured to measure the signal in a time window the value of which multiplied by the value of the rate that each respective hotspot spreads over said holder or said sample is lower than the value of the infrared wavelengths of the thermal radiation emitted by said hotspot.

2. The device as claimed in claim 1, wherein:

the light source is a pulsed source configured to emit a train of at least one pulse when it is activated, and the synchronization signal is emitted depending on said train of at least one pulse.

3. The device as claimed in claim 1, wherein:

the light source is a continuous-wave or pulsed light source that is time modulated at a modulation frequency, the infrared-detecting device furthermore comprising a demodulator configured to demodulate the signal output from the infrared detector at the modulation frequency or one of its harmonics.

4. The device as claimed in claim 1, wherein the infrared detector comprises at least one of:

a single-channel infrared detector or an infrared imager, or an infrared spectrometer.

5. The device as claimed in claim 1, furthermore comprising the holder, the device adopting either one of the following configurations:

a reflection configuration in which the light source and the infrared detector are placed on the same side of the holder, and a transmission configuration in which the light source and the infrared detector are placed on either side of the holder.

6. The device as claimed in claim 5, furthermore comprising a scanning device configured to modify the relative position of the focal point of the beam and of the holder.

7. The device as claimed in claim 1, furthermore comprising the sample, said sample being comprised in a microfluidic channel of a microfluidic cell, said microfluidic cell comprising an external layer that is transparent at the excitation wavelength of the incident beam, and an internal layer that is transparent at the wavelength of the thermal radiation.

8. An infrared-detecting method capable of employing the device as claimed in claim 5, the method comprising steps of:

positioning the sample on the holder, activating the light source, focusing the beam of the light source into a set of at least one focal zone the position of which is preset and comprised in said sample, on a surface of said sample, or at the interface between said sample and said holder, in order to generate a local increase in the thermal radiation emitted by said sample or said holder, connecting said thermal radiation emitted by each focal zone of said set in an optical objective that is combined with the infrared detector, the infrared detector comprising at least one of:

a single-channel infrared detector or an infrared imager, or an infrared spectrometer, generating an output signal representative of the thermal radiation detected by said infrared detector, synchronizing said infrared detector and said light source, and activating the infrared detector in a preset time window, starting a preset time after the activation of the light source.

9. The method as claimed in claim 8, furthermore comprising steps of:

time modulating said continuous-wave or pulsed light source at a modulation frequency, and demodulating the signal output from the infrared detector at the modulation frequency or one of its harmonics with a demodulator of the infrared-detecting device, and wherein, if the light source is a pulsed source, it is configured to generate a pulse train comprising a set of rising edges and falling edges, the step of activating the infrared detector comprising activating the infrared detector at the latest on the last falling edge of the pulse train.

* * * * *